Oct. 13, 1931.　　　　C. HANSEN　　　　1,826,779
PROCESS FOR THE ABSORPTION OF HYDROGEN SULPHIDE AND AMMONIA FROM GASES
Original Filed June 18, 1927
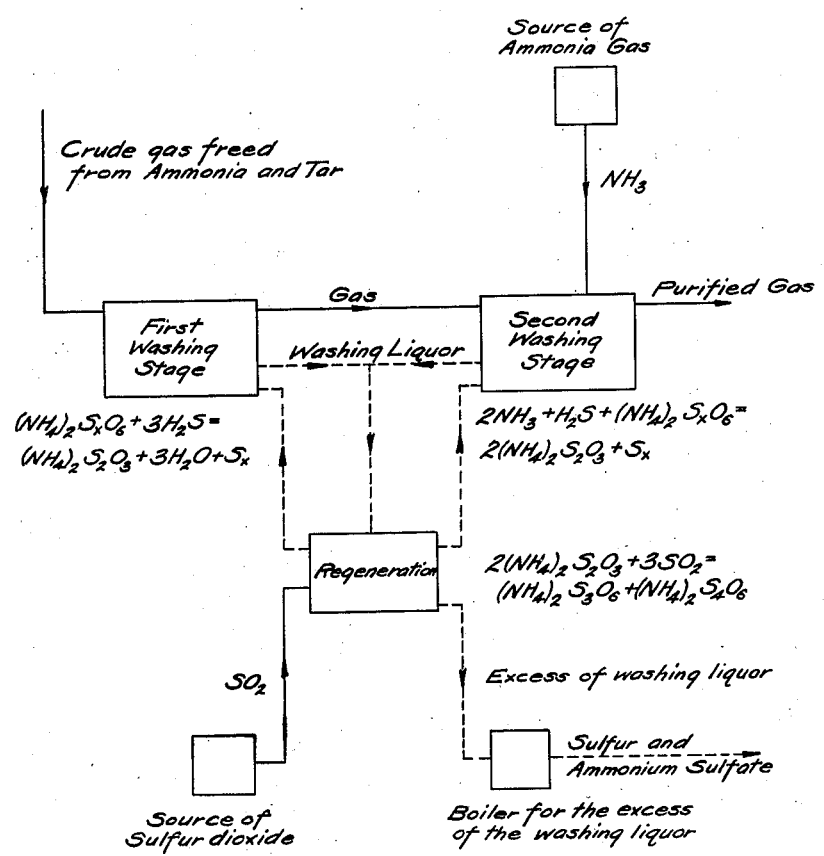
Inventor:
Christian Hansen
By Byrnes, Townsend & Brickenstein
his Attorneys Patented Oct. 13, 1931

1,826,779

UNITED STATES PATENT OFFICE

CHRISTIAN HANSEN, OF ESSEN-STADTWALD, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

PROCESS FOR THE ABSORPTION OF HYDROGEN SULPHIDE AND AMMONIA FROM GASES

Original application filed June 18, 1927, Serial No. 199,862, and in Germany July 21, 1926. Divided and this application filed June 19, 1928. Serial No. 286,712.

This present invention concerns the absorption of ammonia and hydrogen sulphide from industrial gases by washing with solutions containing ammonium polythionate and ammonium thiosulfate and is diagrammatically illustrated by the accompanying flow-sheet. The process is carried out in two stages, such that the ammonia, which for a part or wholly is separated before the washing process, is introduced in the second stage and in the first stage sufficient hydrogen sulphide is precipitated as sulfur (if necessary with the addition of sulfurous acid) to make available in the second stage more than two molecules of ammonia in respect of every one molecule of hydrogen sulphide to be removed. The process may be carried out under increased pressure.

Hitherto it has not been possible to carry out technically the separation of ammonia and hydrogen sulphide for industrial gases by means of ammonium polythionate solutions, since the velocity of the respective reactions, in particular that between hydrogen sulphide and the polythionate:

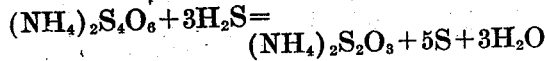

$(NH_4)_2S_4O_6 + 3H_2S = (NH_4)_2S_2O_3 + 5S + 3H_2O$ is too small.

In accordance with the present invention the absorption proceeds sufficiently rapidly provided that sufficient ammonia is present to enable the following reaction to occur:

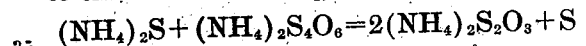

$(NH_4)_2S + (NH_4)_2S_4O_6 = 2(NH_4)_2S_2O_3 + S$

It does, however, not suffice for causing this reaction to take place, to add the requisite amount of ammonia in the proportion of two molecules of ammonia to one molecule of hydrogen sulphide, indicated in the equation, since the reaction only proceeds in neutral or better still in weakly alkaline solution. The polythionate solutions in fact undergo a constant gradual spontaneous decomposition, with the result that the sulfurous acid thus set free combines with part of the added ammonia to form sulfite or thiosulfate. It follows that to obtain a quantitative conversion of the hydrogen sulphide it will be necessary to add a corresponding quantity of ammonia over and above the ratio of two molecules of ammonia to one molecule of hydrogen sulphide. It suffices in general to add 2.3–2.5 parts of ammonia to 1 part of hydrogen sulphide.

Now coal gases do not contain sufficient ammonia to comply with this ratio, and also the quantity of hydrogen sulphide no longer suffices to convert into ammonium sulfate the excess of ammonia over the ratio of two molecules of ammonia to one molecule of hydrogen sulphide which must therefore be added in the form of sulfur or sulfur dioxide.

Further in accordance with my invention the separation of ammonia and hydrogen sulphide from industrial gases by means of polythionate and thiosulfate containing solutions can nevertheless be carried out technically with the quantities of ammonia and hydrogen sulphide available in the said gases by carrying out the process in two stages in such a manner that a part of the ammonia or the whole ammonia is separated before the washing process and introduced in the second stage. In the first stage the gas which comes from the ammonia absorption with a temperature of 25–30° C. is freed by washing with polythionate and thiosulfate containing solution from hydrogen sulphide to the extent that in the second stage more than two molecules of ammonia are available for one molecule of the hydrogen sulphide still to be removed. The sulfur precipitated in the first stage supplements the quantity of sulfurous acid necessary for the regeneration of the wash liquors.

The solutions produced in the absorption process, containing mainly ammonium thiosulfate are reconverted in the known manner to polythionate by means of sulfurous acid:

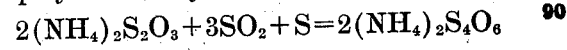

$2(NH_4)_2S_2O_3 + 3SO_2 + S = 2(NH_4)_2S_4O_6$ or

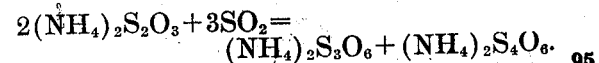

$2(NH_4)_2S_2O_3 + 3SO_2 = (NH_4)_2S_3O_6 + (NH_4)_2S_4O_6.$

However the solution in the absorption is not used until the polythionate is completely converted, but it is already regenerated, when a certain quantity of polythionate, besides thiosulfate still remains in the wash liquor.

Likewise in the regeneration the whole of the thiosulfate need not be converted into polythionate and the wash liquor thus after regeneration still contains thiosulfate.

In the first step sulfurous acid may also be added in a quantity corresponding to the medium amount of hydrogen sulphide, so that in this case the solution advantageously contains a little more thiosulfate than polythionate. The reaction then proceeds mainly according to the equation:

$$2H_2S + SO_2 = 2H_2O + 3S$$

and is facilitated by the presence of thiosulfate. The unconverted portion of the sulfurous acid combines with the thiosulfate to form polythionate. By providing an excess of sulfurous acid the wash liquors produced in the first and second stages can be mutually interchanged, with the result that a separate regeneration becomes unnecessary, since in the first stage a solution containing an excess of polythionate is produced and in the second stage one containing an excess of thiosulfate.

The introduction of ammonia in the second stage can be effected jointly with the gas or directly to the liquid, in the latter case also in the form of aqueous ammonia.

The concentration of the liquor on account of thiosulfate and polythionate is kept as high as possible to avoid higher costs for evaporation.

The process can be carried out wholly or partially under superatmospheric pressure.

The working up of the wash liquors to ammonium sulfate and sulfur is carried out in the known manner.

This is a division of my copending application Ser. No. 199,862, of June 18, 1927.

Under the term "stage" used in the claims I understand one or several washing treatments, every "stage" using the same washing liquor.

I claim:

1. In the process for separating ammonia and hydrogen sulphide from gases containing same by washing the gases with liquors containing ammonium polythionate and ammonium thiosulfate, the steps which comprise separating from the gases at least a part of their ammonia content, washing the residual gases in two stages thereby separating from the gases in the first stage such a part of the hydrogen sulphide content that in the second stage for one molecule of hydrogen sulphide more than two molecudes of ammonia are available by adding the separated ammonia to the second washing stage.

2. In the process for separating ammonia and hydrogen sulphide from gases containing same by washing the gases with liquors containing ammonium polythionate and ammonium thiosulfate, the steps which comprise separating from the gases at least a part of their ammonia content, washing the residual gases in two stages, thereby separating from the gases in the first stage such a part of the hydrogen sulphide content, that in the second stage for one molecule of hydrogen sulphide more than two molecules of ammonia are available by the addition of such a quantity of sulfurous acid to the first washing stage as is about chemically equivalent to the amount of hydrogen sulphide present in the gases and by adding the separated ammonia by the second washing stage.

3. In the process for separating ammonia and hydrogen sulphide from gases containing same by washing the gases with liquors containing ammonium polythionate and ammonium thiosulfate, the steps which comprise separating from the gases at least a part of their ammonia content, washing the residual gases in two stages, thereby separating from the gases in the first stage such a part of the hydrogen sulphide content, that in the second stage for one molecule of hydrogen sulphide more than two molecules of ammonia are available by the addition of such a quantity of sulfurous acid to the first washing stage as is about chemically equivalent to the amount of hydrogen sulphide present in the gases and by adding the separated ammonia to the second washing stage, and exchanging the washing liquors obtained in the two stages.

4. Process according to claim 1 consisting in effecting the separation of ammonia and hydrogen sulphide under superatmospheric pressure.

5. Process according to claim 2 consisting in effecting the separation of ammonia and hydrogen sulphide under superatmospheric pressure.

6. Process according to claim 3 consisting in effecting the separation of ammonia and hydrogen sulphide under superatmospheric pressure.

In testimony whereof I have hereunto set my hand.

CHRISTIAN HANSEN.